(12) United States Patent
Reynolds (10) Patent No.: US 9,536,217 B2
(45) Date of Patent: Jan. 3, 2017

(54) OBJECT ASSOCIATION USING DYNAMIC OBJECT LOCATION CORRELATION

(71) Applicant: Trimble Navigation Limited, Sunnyvale, CA (US)

(72) Inventor: James C. Reynolds, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 14/502,999

(22) Filed: Sep. 30, 2014

(65) Prior Publication Data

US 2016/0092832 A1    Mar. 31, 2016

(51) Int. Cl.
*G06Q 10/08* (2012.01)
*G01C 21/20* (2006.01)
*G06Q 10/00* (2012.01)

(52) U.S. Cl.
CPC ............. *G06Q 10/087* (2013.01); *G01C 21/20* (2013.01); *G06Q 10/00* (2013.01)

(58) Field of Classification Search
CPC ........ G06Q 10/087; G06Q 10/00; G01C 21/20
USPC .......................................................... 701/519
See application file for complete search history.

(56) References Cited

U.S. PATENT DOCUMENTS

2014/0209676 A1    7/2014  Reynolds et al.
2014/0278051 A1*   9/2014  McGavran ............. G01C 21/00
                                                   701/400

OTHER PUBLICATIONS

"PCT/US2015/052378 International Search Report", Nov. 23, 2015, pp. 1-11.

\* cited by examiner

*Primary Examiner* — Brian P Sweeney
(74) *Attorney, Agent, or Firm* — Kilpatrick Townsend & Stockton LLP (57) ABSTRACT

A method of object association is disclosed. The method includes receiving object location information for a first object, receiving object location information for a second object, determining an existence of a correlation between a varying position of the first object and a varying position of the second object over for a predetermined amount of time and dynamically associating the first object with the second object based on the correlation.

21 Claims, 6 Drawing Sheets

OBJECT ASSOCIATION USING DYNAMIC OBJECT LOCATION CORRELATION

BACKGROUND

Assets used in a field service operation entering the field service company supply chain typically have excellent documentation, inventory, and accountability at the initial point of receipt, such as the central warehouse or at the organization that directly receives an item (e.g., the directly delivered test set). However, once there is movement of that asset beyond the initial point of entry into a field service company control, inventory, and accountability become a real problem regarding loss prevention, leakage, and lack of asset knowledge leading to overstock.

Today assets used by field service technicians are not tracked with the kind of precision needed for proper accountability and control. In some cases today, where companies have tried to implement accountability and control measures, increases in labor costs and human intervention have been known to cause errors and reduce the accuracy of these control measures.

BRIEF DESCRIPTION OF THE DRAWINGS

The drawings referred to in this Brief Description of the Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

NOTATION AND NOMENCLATURE

Unless specifically stated otherwise as apparent from the following discussions, it is appreciated that throughout the present Description of Embodiments, discussions utilizing terms such as "associating," "establishing," "inferring," "back-dating," "detecting," "reporting," "storing," "receiving," "determining," "disregarding," "using," "conveying," "generating," "displaying," "indicating," "including," "providing," "assigning," "accessing," "comparing," "retrodeclaring," "prodeclaration," "disassociating," or the like, often (but not always) refer to the actions and processes of a computer system or similar electronic computing device such as, but not limited to, a display unit or component thereof. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Overview of Object Association

Object association takes on many forms. It can be associating a driver with the vehicle he's driving, a trailer attached to a truck, a student on a bus they are on, a train car with the train of which it's a member, vehicles in a convoy or a host of many other associations that are made de every day.

These associations are required as part of many different business processes/practices to track which driver was driving the van for which a complaint call was received, making sure students are on the right bus or a host of other situations where association between two objects is required or desired.

Solutions today require that the two objects have some sort of direct interaction to create the corresponding association. A driver must login using a data terminal mounted in a vehicle, for example. Trucks and trailers must have a direct communication link for the trailer to communicate with the truck that the specific trailer is now attached. In both example, this information is typically of no practical use to the vehicle operator and is simply communicated to a central facility for use there.

This direct interaction between objects typically requires a custom communications mechanism between the two objects, requiring that they both are association system aware, meaning they can communicate back to the central information facility. Trailers need a mechanism to communicate with their trucks, drivers need to login, students need to swipe a card, etc. The custom communications mechanism, manual operations and additional infrastructure leads to systems that are error-prone and/or expensive.

Embodiments described below overcome these shortcomings by taking advantage of the proliferation of objects that are position-aware, for example, positioning system (e.g., a Global Positioning System (GPS) receiver or a Global Navigation Satellite System (GNSS) receiver) enabled and have communications capabilities. For example, cell phones with GPS, cars with GPS and cellular capabilities, etc. are continuously geographically located or locatable.

By using a time lapse pattern matching between two or more location histories, a strong statistical correlation between these histories would indicate that the objects are close together and are likely associated.

For example, if the time lapse position history an employee's GPS enabled cell phone strongly correlates with the time lapse position history of a GPS enabled vehicle, embodiments described herein infer with a great amount of confidence that the employee is in that vehicle.

Once sufficient data to ensure the strength of the correlation between object position histories, embodiments described herein extrapolate back in time to the first instance of time and location when the two objects began to move together and declare that they must have been associated then and there also. At the same time there was insufficient data to declare a strong correlation but their subsequent travel together allows one to declare that they were together from the start.

Example Computer System

Figure 1:
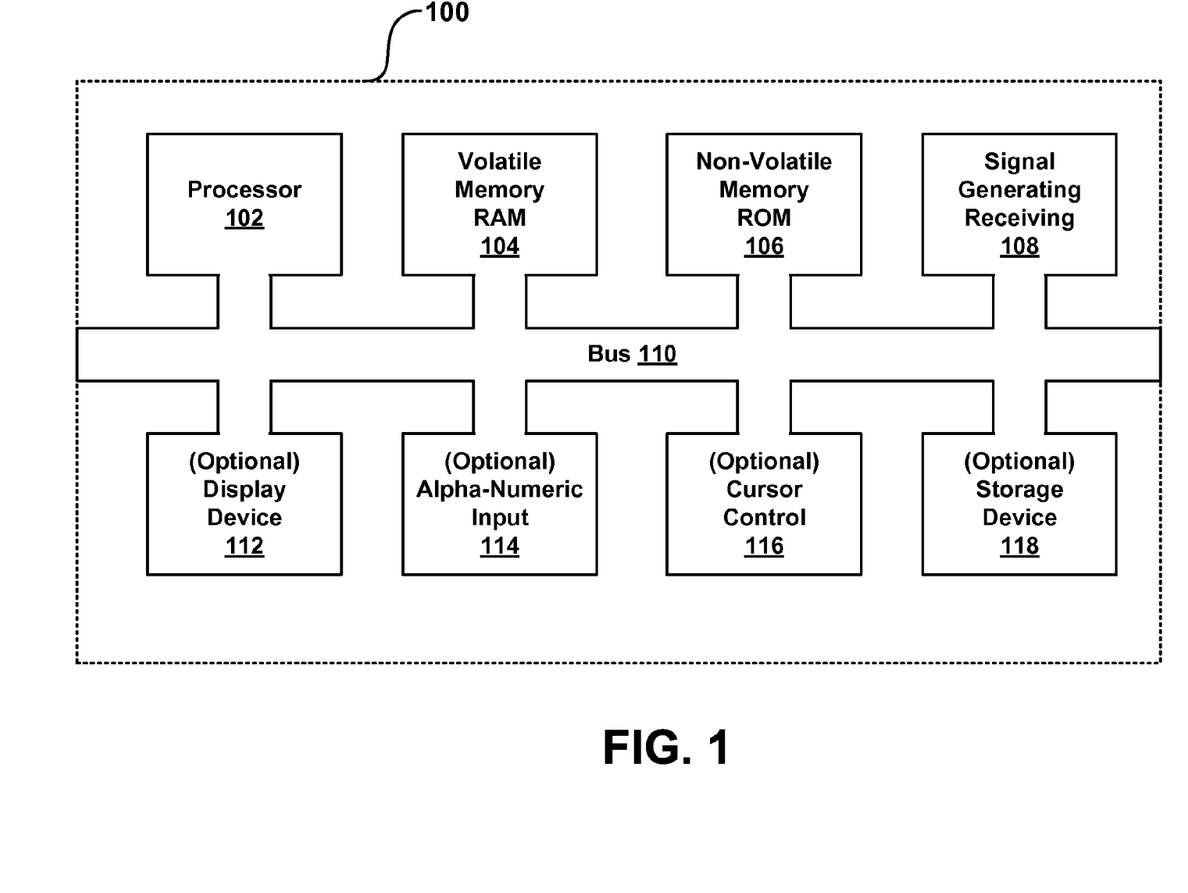
FIG. 1 is a block diagram of an example computer system used in accordance with various embodiments.

With reference now to FIG. 1, a block diagram of an embodiment of an example computer system 100 used in accordance with various embodiments. It should be appreciated that computer system 100 is not strictly limited to be a computer system. As such, computer system 100 of the present embodiment may be well suited to be any type of computer device (e.g., server computer, portable computer device, desktop computer, mobile phone, pager, personal digital assistant, etc.). Within the present discussions, certain processes and steps are discussed that are realized, in some embodiments, as a series of instructions (e.g., software program) that reside within computer readable memory units and executed by a processor(s) of computer system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired and/or wireless communication technology.

Optionally, computer system 100 may include an alphanumeric input device 114 including alphanumeric and function keys coupled to the bus 110 for communicating information and command selections to the central processor(s) 102. The computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it may be appreciated that a cursor may be directed and/or activated via input from the alphanumeric input device 114 using special keys and key sequence commands. The present embodiment is also well suited to directing a cursor by other means such as, for example, voice commands.

The computer system 100 of FIG. 1 may also include one or more optional computer usable data storage devices 118 such as a magnetic or optical disk and disk drive (e.g., hard drive or floppy diskette) coupled with bus 110 for storing information and instructions. An optional display device 112 may be coupled to bus 110 of computer system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Asset Management

Embodiments described herein provide a method and system for asset management. In general, embodiments described herein utilize a plurality of disparate sources for monitoring asset activity. Each disparate source provides an asset report which is populated in a database. The database is organized to combine the plurality of asset reports resulting in an organized single source of asset information. The resulting database will provide a vast plethora of asset management data with a depth significantly greater than a single information source can provide. The asset information for two or more assets can be compared to determine a level of association between assets.

Furthermore, due to the asset management capabilities described herein a significant business management tool is realized. That is, because the asset management system is useful at all levels of asset management, the asset management system provides significant value added features at the manufacture level, the rental/lease level, and the owner level. Moreover, the value added features may very likely be "sell themselves" features.

Asset Management Network

Figure 2A:
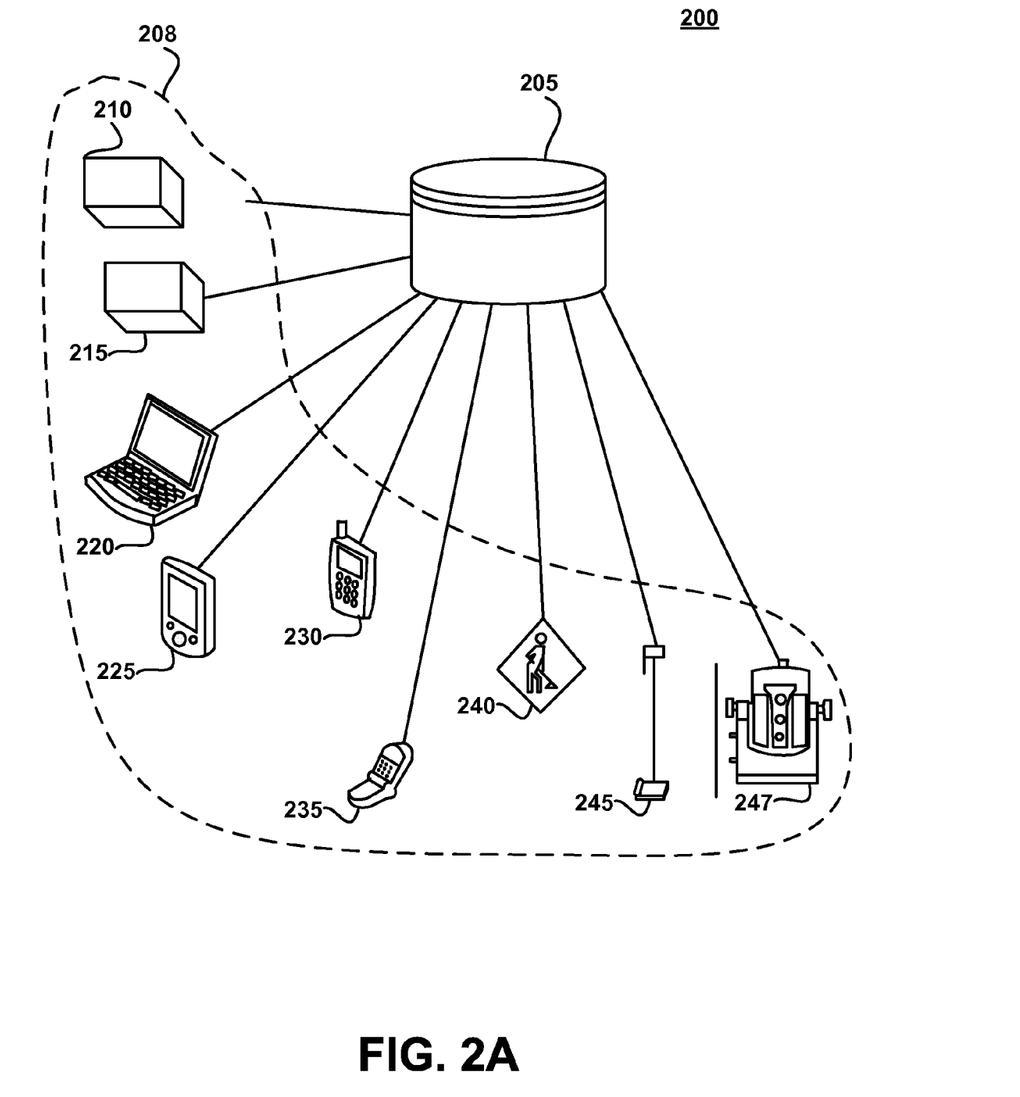
FIG. 2A is a network diagram of an example method for asset management in accordance with various embodiments.
Figure 2B:
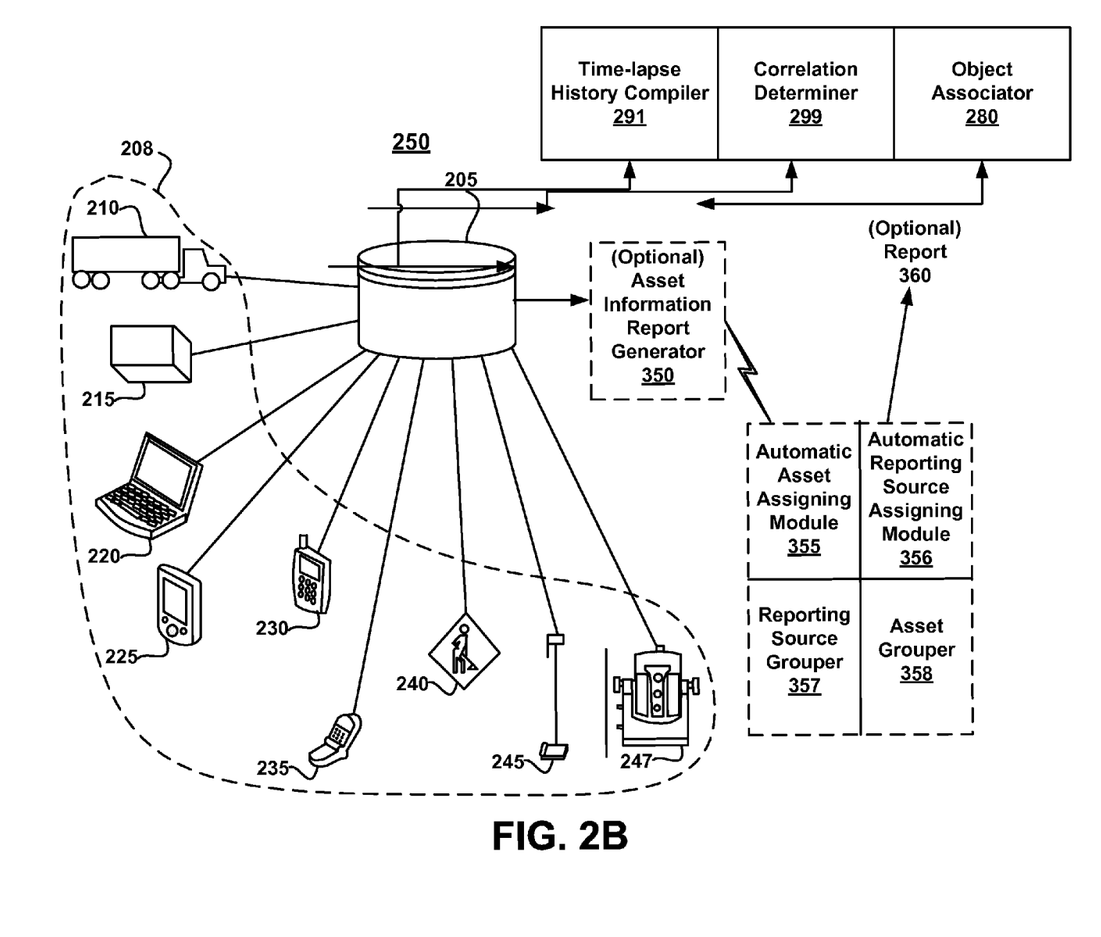
FIG. 2B is a network diagram of an example method for asset management including an asset information report generator and its modules in accordance with various embodiments.

With reference now to FIGS. 2A and 2B, a network diagram of an example asset management is shown in accordance with one embodiment. Asset management network 200 includes a database 205, and a plurality of reporting sources 208. In one embodiment, reporting sources 208 include an application configured to report position and time information to a database.

Database 205 receives information from at least two reporting sources 208 and the data within database 205 is organized such that information regarding an asset can be ascertained. For example, the data within database 205 may be organized such that information regarding a particular asset or a plurality of assets, can be ascertained or accessed. In one embodiment, database 205 is a cloud-based data storage system.

Database 205 is coupled with a time-lapse history compiler 291, correlation determiner 299 and object associator 280. The reporting sources 208 capture events to compile a time lapse position history for each asset. Based on the observed operations, associations between assets can be determined by how closely one asset's position history matches another asset's position history.

In various embodiments, time-lapse history compiler 291 receives operation data in real-time or via non-realtime delayed reports. Time-lapse history compiler 291 compiles a time-lapse history including Position, Velocity and Time (PVT) data points for an object based on information reported for the object. The correlation determiner 299 compares the time-lapse histories of the assets and if the time-lapse data for one asset closely matches the time-lapse history of another asset, an association can be made based on a statistical level of confidence the time-lapse data correlates. The object associator 280 associates assets that have correlating time-lapse histories. In one embodiment, maximum threshold levels of confidence and minimum threshold levels of confidence for correlating time-lapse histories can be determined.

In one embodiment, database 205 is a single database on a single computer system such as computer system 100. In another embodiment, database 205 may actually consist of a plurality of databases on a single computer system or on a plurality of computer systems. Moreover, the plurality of databases may be in the same location or spread throughout a plurality of locations. Additionally, the plurality of databases may be wired or wirelessly coupled together to form a network of databases upon which the asset information may be stored. In one embodiment, the asset may be machinery, a vehicle, an electrical or mechanical device, an inanimate object or any other traceable item.

Plurality of reporting sources 208 include devices such as, but not limited to, permanently mounted device 210, asset mountable/detachable device 215, portable computing device 220, personal digital assistant 225, smart phone 230, mobile phone 235, human intelligence (HumInt) 240, global navigation satellite system (GNSS) survey rover 245 and machine control system 247. Although, a plurality of reporting sources 208 is shown, the list is an example. It is appreciated that the reporting source 208 may include any number of reporting sources and reporting source methods including audio, video, text, Braille, code, passwords and the like. For example, reporting sources 208 can include electronic devices, GNSS enabled devices, machine controls, video enabled devices (e.g., camera enabled handheld devices (such as a mobile phone with camera/video, PDA with camera/video, watch with camera/video, etc.), video cameras, webcams, and the like), human sources, the asset being monitored, other assets, and the like. In one embodiment, any or all of the reporting sources 208 are capable of providing asset information including, but not limited to, location information, operation information and status information.

In one embodiment, asset mountable/detachable device 215 may be a TrimTrac™ device, a DCM300, SNM940 or SNM451 device (provided by Trimble Navigation Limited), a radio frequency identifier (RFID), a global navigation satellite system (GNSS) receiver, a video device providing a video feed, and the like. Moreover, each reporting source 208 may include capabilities such as position fixing, photography, text messaging, voice messaging, data messaging, radio frequency identification tag reading and the like. In one embodiment, any or all of the reporting sources 208 are monitoring devices. Furthermore, in one embodiment, any or all of the reporting sources 208 may be capable of asset operation monitoring. For example, any or all of the reporting sources 208 may be capable of being connected to the asset to monitor aspects of the asset including, but not limited to, a J-bus, a CAN-bus, a processor coupled with the asset, a diagnostic evaluator, an engine microprocessor, a mileage indicator, a speedometer, a tachometer, an oil pressure indicator, a wheel pressure indicator, a hydraulic indicator, an engine time monitor, an ignition switched power source, and the like.

With reference now to FIG. 2B, a network diagram for asset management is shown in accordance with another embodiment. In one embodiment, asset management network 250 includes a database 205, and a plurality of reporting sources 208 which are similar in form and function to that of FIG. 2A and are not described again in detail for purposes of brevity and clarity. Asset management network 250 also includes object associator 280, correlation determiner 299 and time-lapse history compiler 291. Asset management network 250 also includes the optional asset information report generator 350 and optional asset information report 360. Further details of the description and operation of optional asset information report generator 350 and optional asset information report 360 are provided in the discussion of FIG. 3.

Asset management network 250 also includes an automatic asset assigning module 355, an automatic reporting source assigning module 356, a reporting source grouper 357 and an asset grouper 358. In general, these components are optional and are used to provide further organization to the asset information report 360. For example, a preference may be selected to group a plurality of assets based on location, etc. such as described in more detail herein.

Basically, automatic asset assigning module 355 is configured to assign an asset to a section in the asset information report 360. Automatic reporting source assigning module 356 is configured to assign first reporting source 208A, second reporting source 208B and any or all other reporting sources 208 to a section in asset information report 360. Reporting source grouper 357 is configured to group first reporting source 208A, second reporting source 208B and any or all other reporting sources 208 into at least one source group based on location. Asset grouper 358 is configured to group at least one asset into at least one group.

Asset Management System

Figure 3:
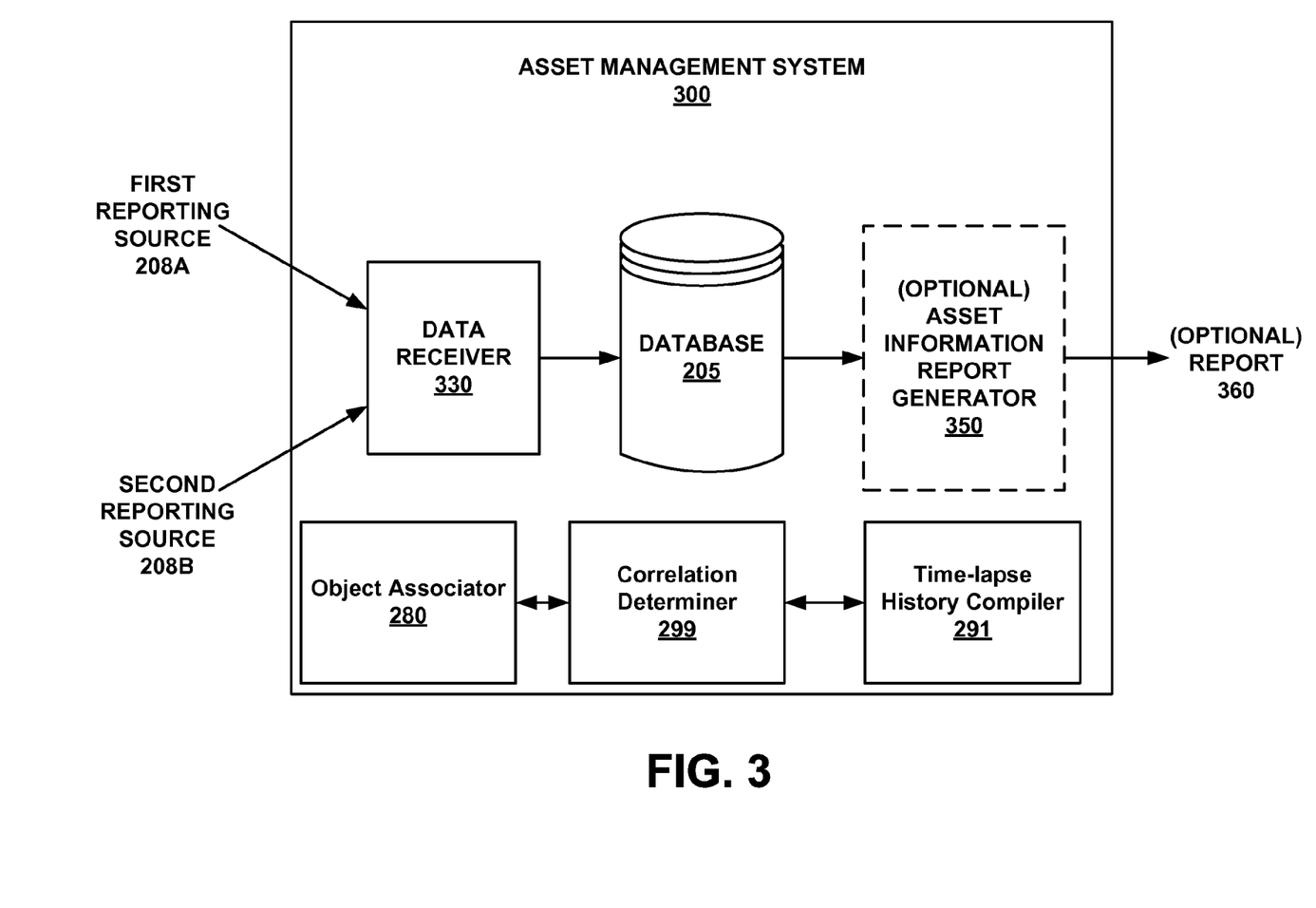
FIG. 3 is a block diagram of an example asset management system in accordance with various embodiments.

Referring now to FIG. 3, a block diagram of an example asset management system 300 is shown in accordance with one embodiment. In one embodiment, asset management system 300 receives input from a first reporting source 208A and a second reporting source 208B. A time-lapse history compiler 291 uses the observed data from the reporting sources to compile a time-lapse PVT history for a particular set of assets and/or tasks. In one embodiment, the activities reported by the reporting sources are statistically compared using the correlation determiner 299. Matches between time-lapse PVT histories can be used to create associations between assets by the object associator 280.

In general, the first reporting source 208A and the second disparate reporting source 208B are selected from the group of reporting sources 208 of FIG. 2A. Furthermore, the first reporting source 208A and second reporting source 208B may be similar or different reporting sources. Moreover, there may be more than two different reporting sources providing information to asset management system 300. For example, there may be three, four, seven, fifteen, or any number of different reporting sources providing information to asset management system 300. The use of two different reporting sources herein is shown merely for purposes of brevity and clarity. In one embodiment, the reporting sources input to asset management system 300 consists of information about an asset such as, but not limited to, operation, location, status, and the like.

In one embodiment, asset management system 300 includes a data receiver 330 and a database 205. In general, data receiver 330 is a wired or wireless connection that provides a connection between the asset management system 300 and the outside reporting sources such as first reporting source 208A and second reporting source 208B. In one embodiment, the connection is a network connection such as a local area network (LAN) connection, a wide area network (WAN) connection, a virtual private network (VPN), a cellular network, or the like. In another embodiment, the data receiver 330 will receive the information from the reporting sources via a direct connection. For example, the first reporting source 208A may be communicatively coupled (either wired such as via a universal serial bus (USB), firewire, or other data port, or wirelessly such as Bluetooth or the like) with the data receiver 330 and the information may be received directly to data receiver 330.

Data receiver 330 then (wired or wirelessly, via cell, WiFi, etc.) passes the received asset information to the database 205 wherein the information regarding the asset is stored. As stated herein, database 205 may be a single database on a single computer system or may actually consist of a plurality of databases on a single computer system or on a plurality of computer systems. Moreover, the plurality of databases may be in the same location or spread throughout a plurality of locations. Additionally, the plurality of databases may be wired or wirelessly coupled together to form a network of databases upon which the asset information may be stored.

In one embodiment, database 205 stores a first route history for a first moving object based on received object PVT information for the first moving object. The database 205 also stores a second route history for a moving second object based on received object PVT information for the second moving object. Route histories for additional moving objects may similarly be stored. In one embodiment, the time-lapse history complier infers a route for an object based on received PVT data.

In one embodiment, asset management system 300 performs as a system for object association. The system for object association includes a processor, such as processor 102, a data receiver, such as data receiver 330, a database, such as database 205, a correlation determiner, such as correlation determiner 299 and an object associator, such as object associator 280. In one embodiment, the system for object association also includes time lapse history compiler 291 that may perform functions such as back-dating or foreward-dating that can be used for inferring or predicting at least one position and/or time associated with an object based on the position history of the object. In one embodiment, the correlation determiner 299 determines if a statistical correlation between objects meets a predetermined threshold. The threshold can be used to either make an association between two or more objects or to disassociate two or more objects. In one embodiment, the status of an association may be reported to database 205.

In one embodiment, the correlation determiner 299 is coupled with the database and determines an existence of a statistical correlation, beyond a predetermined threshold, between the first varying route history and the second route history. It is appreciated that any number of thresholds could be used to determine correlation. For example, a higher level of confidence may be used on mission critical determinations and/or a lower threshold may be used in other instances that require less assurance.

In one embodiment, an object associator 280 is coupled with the correlation determiner 299 and dynamically associates the first moving object with the second moving object based on the statistical correlation and thresholds.

In one embodiment, the object associator serves as a back-dating determiner for retrodeclaration of the association back in time to a first coincidence of the first route history and the second route history.

In one embodiment, the object associator serve as a forward-dating determiner for prodeclaration of the association forward in time to a last coincidence of the first route history and the second route history.

In one embodiment, the object associator serves as a position and time predictor for inferring at least one position and time of the first moving object based on the first route history for the first moving object. For example, based on the route history, embodiments may predict a particular position and/or time of travel that was not exactly reported, but may be between 2 or more reported PVTs. In one embodiment, report generator 350 reports the statistical correlation to database 205.

In one embodiment, the correlation determiner 299 determines if the statistical correlation falls below a predetermined threshold and in response, the object associator 280 disassociates the first moving object with the second moving object if an association has previously been made between the first moving object and the second moving object.

In one embodiment, a data receiver at database 205 receives the first route history for the first moving object from an electronic device, such as a reporting source 208, coupled with the first moving object. In one embodiment, a data receiver at database 205 receives the second route history for the second moving object from an electronic device, such as a reporting source 208, coupled with the second moving object.

In one embodiment, asset management system 300 may also include an optional report generator 350 which may provide an optional asset information report 360. In general, optional report generator 350 is one of a myriad of possible methods for organizing and presenting the information stored in database 205. For example, a user may query the asset management system 300 regarding one or more assets. The asset management system 300 may simply provide the results of the query to the optional report generator 350. Optional report generator 350 then generates optional asset information report 360 which would include the answers to the user's query. The optional asset information report 360 may be presented in a plurality of ways depending on user preference, system requirements and the like. For example, the optional asset information report 360 may be provided in a visual format, such as a piece of paper, or a graphic user interface (GUI) displayed on a cell phone, a PDA or laptop or desktop computer system. In another embodiment the optional asset information report 360 may be provided in an audible format, or in Braille, or the like.

In one embodiment, any or all of the reporting sources 208 providing information about the asset may be configured to provide information constantly, regularly scheduled information updates, or provide information updates only when requested by a user. For example, the reporting source may be a PDA 225 incorporating a global navigation satellite system (GNSS) receiver with positioning capabilities based on signals from Galileo, GPS, Glonass, WAAS-wide area augmentation service, Egnos and the like. The GNSS PDA 225 may provide constant location information updates to the database. This may be important if the asset is regularly changing location or tracking its movement is important. For example, the asset could include items such as, but not limited to, tracking a concrete truck or the load of concrete in the truck, an armored vehicle, a vehicle performing a lot of movement or the like. In the same manner, any of the information about the asset can be constantly updated, the use of location information herein is merely provided as one example for purposes of brevity and clarity.

However, if the actions of the asset do not require constant updates, then the information may not be constantly provided to the database 205. Using the location example again, if the asset is sitting in the same area, e.g., it is broken, unused, awaiting maintenance, or the like, the location information may only be provided on a scheduled update period. For example, in the morning the location of the asset may be checked and then again in the evening, or only once a day, or only once a week, etc. Additionally, the asset information may be modified based on the asset's status. That is, if the asset is unused, the asset information may be updated only periodically. However, when the asset becomes operational, the information may be updated on a more regular basis, or even constantly.

In addition, in one embodiment, the asset information is presented in the form of an asset information report 360 generated from the data in the database 205. In one embodiment, the data presented in asset information report 360 is a combination of all the information received about an asset from every reporting source 208. However, in another embodiment, the data presented in asset information report 360 is a combination of only portions of the information received about an asset from any or all of reporting sources 208.

For example, database 205 may have redundant information regarding the asset from a plurality of reporting sources 208. That is, more than one reporting source 208 may be providing asset location information. In one embodiment, all the information regarding the asset, including the redundant information, in the database may be used by report generator 350 when generating asset information report 360. However, in another embodiment, report generator 350 may remove the redundant information before generating asset information report 360 to reduce bandwidth, increase report clarity, or the like. In yet another embodiment, the redundant information may be removed at the database level to manage the size of database 205.

Moreover, in one embodiment asset information report 360 may be represented on a GUI, on paper, may be audibly provided, may be digitally provided to another database or application software, or may be provided in another user selected format. For example, the asset information report may be provided in an other than visual format for a user during times, such as, when the asset information report is being provided over a communications network, or for a visually impaired user, or for a user who cannot refer to a visual asset information report for operational/safety reasons, or the like.

Reporting Sources

Referring to FIG. 2A, examples of reporting sources 208 include, but are not limited to, permanently mounted devices 210, asset mountable/detachable device 215, portable computing device 220, personal digital assistant (PDA) 225, smart phone 230, mobile phone 235 and human intelligence 240. Refer to the above discussion of reporting sources for more information on reporting sources. Examples of asset mountable/detachable devices 215 are DCM300, SNM940, SNM451, TrimTrac™ devices, mountable reporting source, and an RFID tag type reporting source.

For more information about TrimTrac™ refer to U.S. patent application Ser. No. 10/952,607 by Nichols et al., filed on Sep. 28, 2004 and entitled "Method and System For Controlling A Valuable Movable Item", assigned to the assignee of the present application and refer to U.S. patent application Ser. No. 11/076,923 by Workman et al., filed on Mar. 31, 2005 and entitled "A portable Motion-Activated Position Reporting Device", assigned to the assignee of the present application.

Different types of reporting sources have different capabilities. For example, a reporting source typically has a constant supply of power and is capable of communicating relatively large amounts of asset information frequently over relatively large distances. An RFID tag type reporting source does not have a supply of power and is capable of communicating a relatively small amount of asset information, such as an identifier, over a relatively short distance. Typically, the more capabilities that a reporting source has the more expensive it is. Therefore, it does not make good business sense to associate expensive reporting sources with relatively inexpensive assets. According to one embodiment, this concern is addressed, among other things, by associating different types of reporting sources with different assets based on the characteristics of the assets and objectives of the construction project.

Time-Lapse Histories

As provided above, by using a time lapse pattern matching between two or more location histories, a strong statistical correlation between these histories would indicate that the objects are close together and are likely associated. It is appreciated that embodiments described can be used for associating and disassociating two or more objects and/or persons.

For example, if the time lapse position history of an employee's GPS enabled cell phone strongly correlates with the time lapse position history of a GPS enabled vehicle, embodiments described herein infer with a great amount of confidence that the employee is in that vehicle.

Once sufficient data to ensure the strength of the correlation between object position histories, embodiments described herein extrapolate back in time to the first instance of time and location when the two objects began to move together and declare that they must have been associated then and there also. At the same time there was insufficient data to declare a strong correlation but their subsequent travel together allows embodiments described herein to declare that they were together from the start of their first noted instance of correlated movement together in their respective routes.

Figure 4:
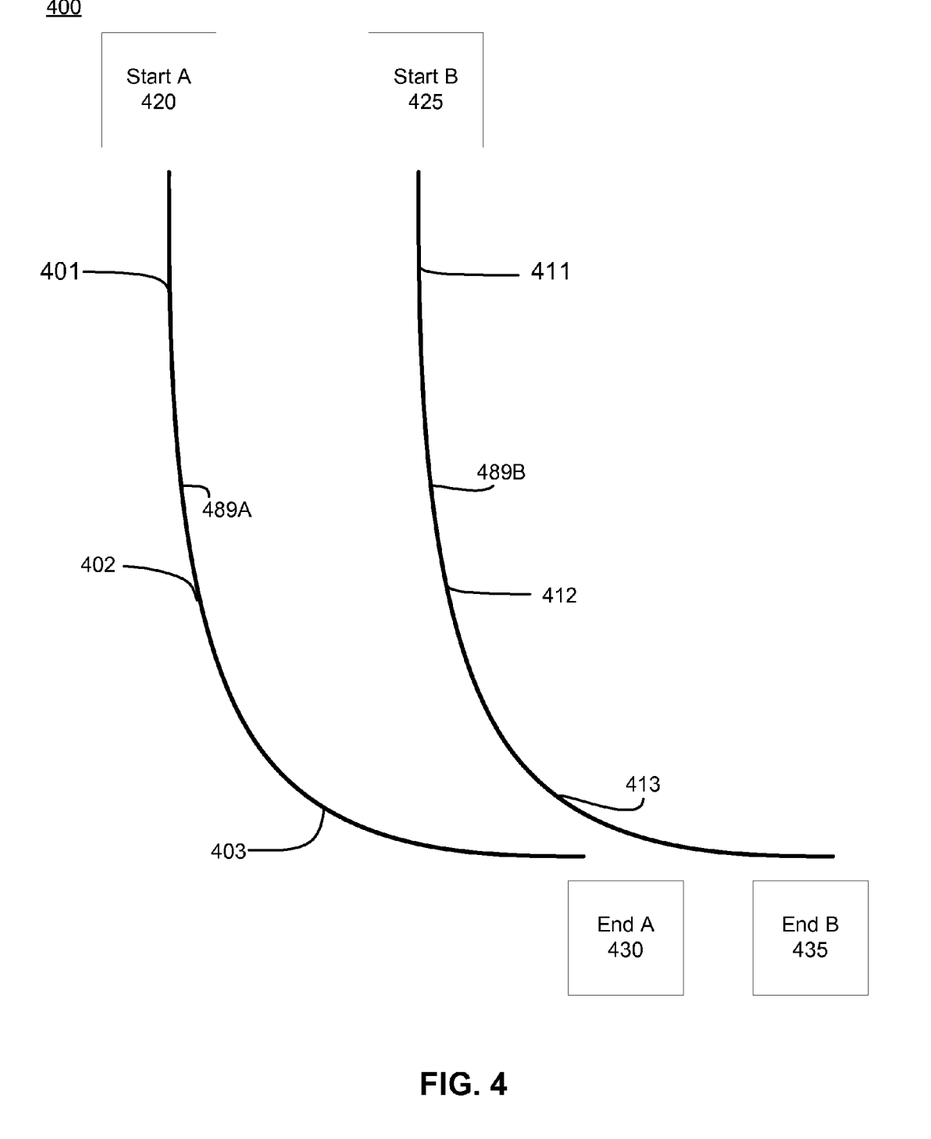
FIG. 4 is an illustration of example time-lapse Position, Velocity, and Time (PVT) histories in accordance with various embodiments.

For example, FIG. 4 shows an exemplary time-lapse PVT history 400 for two assets, object A and object B. Over the course of travel, object A provides PVT data points 401, 402 and 403 to the asset management system 300. Over the course of travel, object B provides PVT data points 411, 412 and 413 to the asset management system 300. In one embodiment, asset A and asset B each have a reporting source, such as reporting source 208 described above that is capable of reporting position, time and velocity information to the asset management system 300.

Based on the received PVT information, the asset management system 300 compiles the PVT information for asset A and asset B and determines if the data points 401-403 and 410-413 statistically correlate. In one embodiment, the correlation determiner 299 interprets a route 489A for asset A and a route 489B for asset B based on the received PVT data. In one embodiment, this interpreted route can be used to correlate PVT data that is mismatched. One example of mismatched data would be if the asset A reported PVT data at different intervals than asset B. In this case, even though the PVT data doesn't match by time, interpreted PVT data from the interpreted routes 489A and 489B can be used to see if an association exists between asset A and asset B.

As provided above, once sufficient data to ensure the strength of the correlation between object position histories is received, embodiments described herein extrapolate back in time to the first instance of time and location when the two objects began to move together and declare that they must have been associated then and there also. For example, once a correlation is found between asset A and Asset B, the starting point of association could be found at start A 420 or start B 425.

At the same time there was insufficient data to declare a strong correlation but their subsequent travel together allows embodiments described herein to declare that they were together from the start. For example, asset B start 425 closely matches with start A 420 of asset A. Additionally, end A 430 and end B 435 could be interpreted as a point of disassociation between asset A and asset B.

The time-lapse PVT histories 400 of FIG. 4 can be described in any number of scenarios. For example, the PVT histories 400 could show the route 489A of a bus and a route 489B of a student. The PVT data points 401, 402 and 403 of the "bus" can be compared to the PVT data points 411, 412 and 413 of the "student." Once sufficient data points are collected to ensure a statistical correlation between the bus and the student, a start point, such as start A 420 or start B 425 for the correlation can be determined. Likewise, an end point of correlation, such as end A 430 or end B 435 can be determined. If a student becomes disassociated prior to an expected location and/or time, an alert can be generated in one embodiment.

Figure 5:
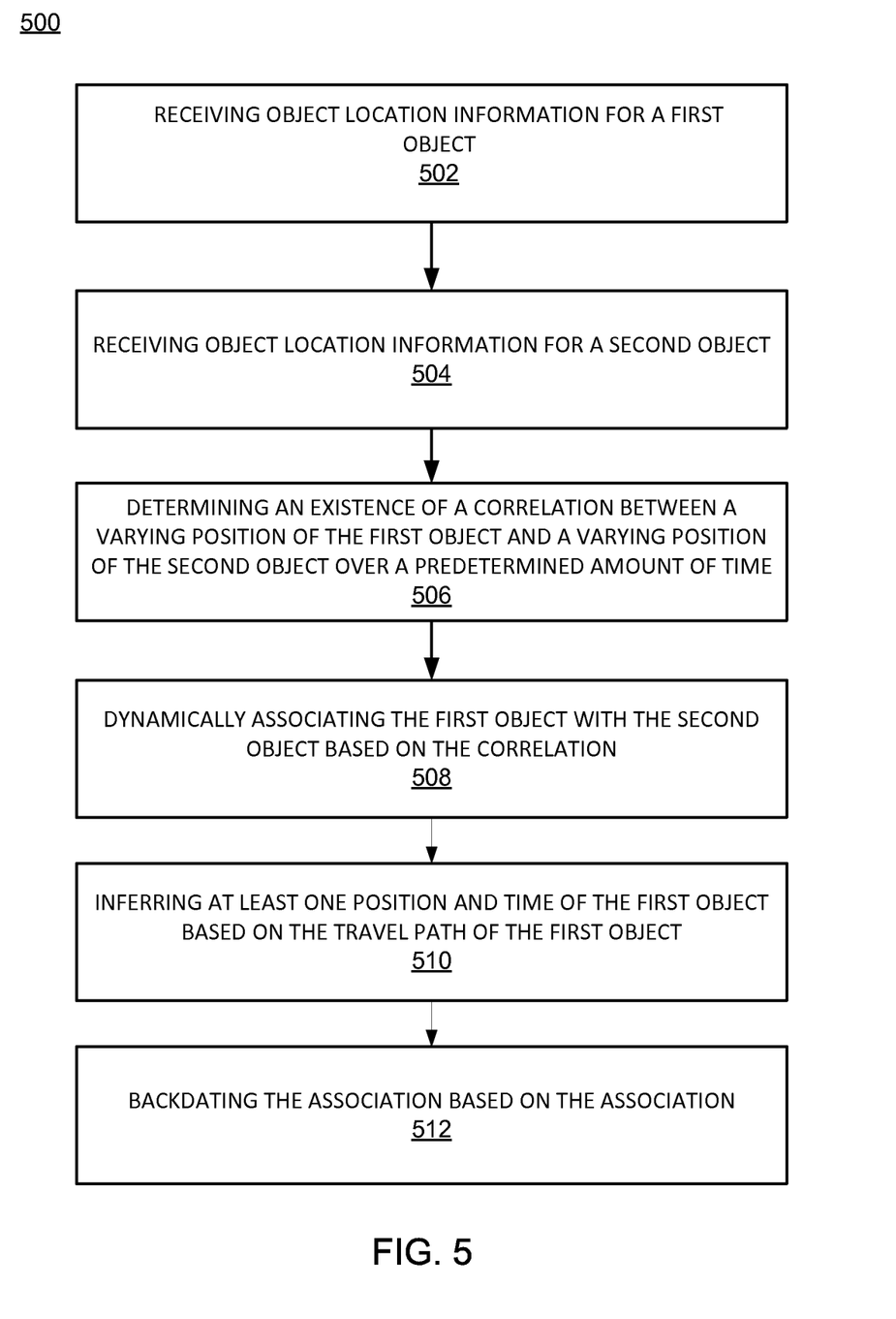
FIG. 5 is a flow diagram of an example asset management method in accordance with various embodiments.

FIG. 5 shows a flow diagram of an exemplary method 500 for object association. In one embodiment, method 500 is used to associate two or more moving objects based on received PVT data for each object while moving. All of, or a portion of, the embodiments described by the flow diagram in FIG. 5 can be implemented using computer-executable instructions which reside, for example, in non-transitory computer-readable storage medium that can be accessed by and a computer system or like device. The non-transitory computer-readable storage medium can be any kind of non-transitory medium that instructions can be stored on. Examples of the non-transitory computer-readable storage medium include but are not limited to: a hard disk drive (HDD), a compact disc (CD), a digital versatile disc (DVD), read only memory (ROM), random access memory (RAM), flash memory and so on. As described above, certain procedures of the embodiments of the present invention are realized, in some embodiments, as a series of instructions (e.g., software program) that reside within non-transitory computer-readable storage medium accessed by a computer system and that are executed by the processor of the computer system. When executed, the instructions cause the processor (and computer system of which it is a part) to implement the procedures of and associated with flow diagram shown in FIG. 5. Although specific procedures are disclosed in a certain order, they may be performed in other orders. Additionally, in some embodiments not all of the procedures that are described are performed and/or other procedures that are not described may be performed.

At 502, method 500 includes receiving object location information for a first object. In one embodiment, the object location information comprises position and time information for an object. In one embodiment, 502 includes storing a first route history for the moving first object based on received object PVT information for the first moving object.

At 504, method 500 includes receiving object location information for a second object. In one embodiment, the object location information comprises position and time information for an object. In one embodiment, 504 includes storing a second route history for the moving second object based on received object PVT information for the second moving object.

At 506, method 500 includes determining an existence of a correlation between a varying position of the first object and a varying position of the second object over a predetermined amount of time. In one embodiment, a statistical threshold can be used to determine correlation. In another embodiment, at 506, method 500 includes determining an existence of a correlation between a varying position of the first object and a varying position of the second object over an increasing level of statistical correlation.

In one embodiment, step 506 of method 500 includes comparing the travel path of the first object to the travel path of the second object.

At 508, method 500 includes dynamically associating the first object with the second object based on the correlation. In one embodiment, 508 includes disassociating the first moving object with the second moving object. Once correlation is determined, any number of things can be performed based on the motivation for determining the correlation.

At 510, method 500 includes inferring at least one position and time of the first object based on the travel path of the first object. In one embodiment, at step 510, method 500 includes inferring at least one position and time that was not received in steps 502 and 504, meaning one position and time is predicted based on other received data points.

At 512, method 500 includes backdating or forward dating the association based on the association. In one embodiment, backdating includes retrodeclaration of the association back in time to a first coincidence of the first route history and the second route history. In one embodiment, forward dating includes prodeclaration of the association forward in time to a last coincidence of the first route history and the second route history. In one embodiment, method 500 includes reporting the correlation to a database.

It is appreciated that embodiments described can be used for any business purpose. For example, a use case scenario where one would want to know who the driver of a vehicle was that was reported as driving poorly. Embodiments described could be used to compare PVT data points between persons and/or objects to make associations. In the example of determining the driver of a vehicle, embodiments described herein compare the vehicle time-lapse position history to the position histories of the possible drivers. A position history of a particular driver that correlates to the position history of the vehicle could indicate that the driver was the one operating the vehicle. In one embodiment, the position history of a particular driver is captured from a GPS in an electronic device associated with the driver. For example, position data may be captured by the driver's cellular phone that has GPS functionality.

In another example, the determination of correlation can be used to charge people for "use" of an item. For example, using the bus scenario described above, riders of a bus can be charged based on how much they "use" the bus. Association between a rider and the bus can be used to billing for a rider who is associated with a bus.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of object association comprising:
receiving, at a data receiver communicatively coupled to a first Global Navigation Satellite System (GNSS)-enabled device and a second GNSS-enabled device, position and time information for a first object from the first GNSS-enabled device, the first GNSS-enabled device coupled to the first object;
receiving, at the data receiver, position and time information for a second object from the second GNSS-enabled device, the second GNSS-enabled device coupled to the second object;
compiling, by a time-lapse history compiler, a first route history for the first object based on the position and time information of the first object;
compiling, by the time-lapse history compiler, a second route history for the second object based on the position and time information of the second object;
determining, by a processor coupled to the time-lapse history compiler, an existence of a correlation between the first route history of the first object and the second route history of the second object over a predetermined amount of time; and
associating, by the processor, the first object with the second object based on the correlation.

2. The method as recited in claim 1, further comprising:
backdating, by the processor, said association based on said association.

3. The method as recited in claim 1, further comprising:
predicting, by the processor, at least one position and time of said first object based on said first route history of said first object.

4. The method as recited in claim 1, further comprising:
reporting, by the processor, said correlation to a database.

5. The method of claim 1 wherein:
the compiling the first route history of the first object comprises interpreting the first route history based on the position and time information of the first object at a first set of time intervals; and
the compiling the second route history of the second object comprises interpreting the second route history based on the position and time information of the second object at a second set of time intervals.

6. The method of claim 5 wherein the second set of time intervals is mismatched from the first set of time intervals.

7. A method of object association comprising:
receiving, at a data receiver communicatively coupled to a first electronic device and a second electronic device, position, velocity and time (PVT) information about a first moving object from the first electronic device, the first electronic device coupled to the first moving object;
receiving, at the data receiver, PVT information about a second moving object from the second electronic device, the second electronic device coupled to the second moving object;
storing, at a database coupled to the data receiver, the PVT information about the first moving object and the PVT information about the second moving object;
compiling, by a time-lapse history compiler coupled to the database, a first route history for the first moving object based on the PVT information about the first moving object;
compiling, by the time-lapse history compiler, a second route history for the second moving object based on the PVT information about the second moving object;
determining, by a processor coupled to the time-lapse history compiler, an existence of a statistical correlation, beyond a predetermined threshold, between the first route history and the second route history; and
associating, by the processor, the first moving object with the second moving object based on the statistical correlation.

8. The method as recited in claim 7, further comprising:
retrodeclaration, by the processor, of said association back in time to a first coincidence of said first route history and said second route history.

9. The method as recited in claim 7, further comprising:
prodeclaration, by the processor, of said association forward in time to a last coincidence of said first route history and said second route history.

10. The method as recited in claim 7, further comprising:
predicting, by the processor, at least one position and time of said first moving object based on said first route history for said first moving object.

11. The method as recited in claim 7, further comprising:
reporting, by the processor, said statistical correlation to a database.

12. The method as recited in claim 7 further comprising:
determining, by the processor, that said statistical correlation falls below said predetermined threshold; and
disassociating, by the processor, said first moving object with said second moving object.

13. The method of claim 7 wherein:
the compiling the first route history for the first moving object comprises interpreting the first route history based on the PVT information about the first moving object at a first set of time intervals; and
the compiling the second route history for the second moving object comprises interpreting the second route history based on the PVT information about the second moving object at a second set of time intervals.

14. The method of claim 13 wherein the second set of time intervals is mismatched from the first set of time intervals.

15. A system for object association comprising:
a processor;
a data receiver communicatively coupled with a first electronic device and a second electronic device, the data receiver for receiving position, velocity and time (PVT) information from the first electronic device about a first moving object coupled thereto, and for receiving PVT information from the second electronic device about a second moving object coupled thereto;
a database coupled with the data receiver for storing the PVT information about the first moving object and the PVT information about the second moving object;
a time-lapse history compiler coupled to the database for compiling a first route history for the first moving object based on the PVT information about the first moving object, and for compiling a second route history for the second moving object based on the PVT information about the second moving object; and
a non-transitory computer-readable storage medium containing instructions which when executed on the processor cause the processor to perform operations including:
determining an existence of a statistical correlation, beyond a predetermined threshold, between the first route history and the second route history; and
associating the first moving object with the second moving object based on the statistical correlation.

16. The system as recited in claim 15, wherein said operations further comprise:

retrodeclaration of said association back in time to a first coincidence of said first route history and said second route history.

17. The system as recited in claim 15, wherein said operations further comprise:
prodeclaration of said association forward in time to a last coincidence of said first route history and said second route history.

18. The system as recited in claim 15, wherein said operations further comprise:
predicting at least one position and time of said moving first object based on said received PVT information of said first object.

19. The system as recited in claim 15, wherein said operations further comprise:
reporting said statistical correlation to a database.

20. The system as recited in claim 15 wherein said operations further comprise:
in response to said statistical correlation falling below said predetermined threshold, disassociating said first moving object with said second moving object.

21. The system of claim 15 wherein the time-lapsed history compiler compiles the first route history for the first moving object by interpreting the first route history based on the PVT information about the first moving object at a first set of time intervals, and compiles the second route history for the second moving object by interpreting the second route history based on the PVT information about the second moving object at a second set of time intervals.

\* \* \* \* \*